United States Patent
Brostmeyer (10) Patent No.: US 9,200,983 B2
(45) Date of Patent: Dec. 1, 2015

(54) APPARATUS AND PROCESS FOR TESTING AN INDUSTRIAL GAS TURBINE ENGINE AND COMPONENTS THEREOF

(75) Inventor: Joseph D. Brostmeyer, Jupiter, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 22 days.

(21) Appl. No.: 14/008,308

(22) PCT Filed: Mar. 15, 2012

(86) PCT No.: PCT/US2012/029231
§ 371 (c)(1),
(2), (4) Date: Nov. 13, 2013

(87) PCT Pub. No.: WO2012/134824
PCT Pub. Date: Oct. 4, 2012

(65) Prior Publication Data
US 2014/0053641 A1 Feb. 27, 2014

Related U.S. Application Data

(63) Continuation of application No. 13/108,029, filed on May 16, 2011, and a continuation of application No. 13/410,051, filed on Mar. 1, 2012.

(60) Provisional application No. 61/468,771, filed on Mar.
(Continued)

(51) Int. Cl.
*G01M 15/14* (2006.01)

(52) U.S. Cl.
CPC ..................................... *G01M 15/14* (2013.01)

(58) Field of Classification Search
CPC .................................. F02C 6/16; G01M 15/14
USPC ......................................................... 73/112.01
See application file for complete search history.

(56) References Cited

U.S. PATENT DOCUMENTS 5,537,822 A * 7/1996 Shnaid et al. ................... 60/659
5,934,063 A * 8/1999 Nakhamkin .................... 60/773
(Continued)

FOREIGN PATENT DOCUMENTS

CN 1042968 A 6/1990
CN 1048911 A 1/1991
(Continued)

OTHER PUBLICATIONS

International Search Report and Written Opinion dated Jun. 27, 2012 for International Application No. PCT/US2012/029231, International Filing Date: Mar. 15, 2012 consisting of 10 pages.
(Continued)

*Primary Examiner* — Freddie Kirkland, III
(74) *Attorney, Agent, or Firm* — Christopher & Weisberg, P.A.

(57) ABSTRACT

A system and a process for testing a gas turbine engine or component thereof, especially for a large aero gas turbine engine, and for a process for testing a large industrial gas turbine engine that requires large flow capacity and pressure ratios. The system and process may include the use of a large compressed air storage reservoir to provide compressed air to the testing system. Further, the system and process may also include the use of a pre-heating system, which may include a heater and a heat exchange device, to warm the compressed air from the compressed air storage reservoir to a temperature suitable to simulate normal operating conditions of the gas turbine engine or component thereof.

23 Claims, 8 Drawing Sheets

Related U.S. Application Data 29, 2011, provisional application No. 61/587,022, filed on Jan. 16, 2012, provisional application No. 61/561,956, filed on Nov. 21, 2011, provisional application No. 61/569,378, filed on Dec. 12, 2011.

(56) References Cited

U.S. PATENT DOCUMENTS

| | | |
|---|---|---|
| 7,444,818 B1 | 11/2008 | Brostmeyer |
| 7,500,349 B2 * | 3/2009 | Althaus ................ 60/39.511 |
| 7,614,237 B2 * | 11/2009 | Nakhamkin ................ 60/772 |
| 8,011,189 B2 * | 9/2011 | Nakhamkin ................ 60/772 |
| 8,261,552 B2 * | 9/2012 | Nakhamkin ................ 60/659 |
| 8,341,964 B2 * | 1/2013 | Finkenrath et al. ........... 60/772 |
| 8,689,566 B1 * | 4/2014 | Coney ................ 60/774 |
| 8,726,629 B2 * | 5/2014 | Coney ................ 60/39.511 |
| 8,739,522 B2 * | 6/2014 | Anikhindi et al. ........... 60/327 |
| 2004/0148922 A1 * | 8/2004 | Pinkerton ................ 60/39.6 |
| 2004/0216535 A1 | 11/2004 | Brostmeyer et al. |
| 2009/0100835 A1 * | 4/2009 | Nakhamkin ................ 60/659 |
| 2010/0043437 A1 * | 2/2010 | Nakhamkin ................ 60/645 |
| 2010/0083660 A1 * | 4/2010 | Nakhamkin ................ 60/652 |
| 2010/0251712 A1 * | 10/2010 | Nakhamkin ................ 60/659 |
| 2011/0094236 A1 * | 4/2011 | Finkenrath et al. ........... 60/772 |
| 2014/0026650 A1 * | 1/2014 | Hobelsberger et al. .... 73/112.02 |

FOREIGN PATENT DOCUMENTS

| | | |
|---|---|---|
| CN | 101225769 A | 7/2008 |
| CN | 101512126 A | 8/2009 |
| KR | 1020090006451 | 1/2009 |
| KR | 2020090006451 | 6/2009 |
| WO | 2008005679 A2 | 1/2008 |
| WO | 2012113831 A2 | 8/2012 |

OTHER PUBLICATIONS

First Examination Report dated Aug. 28, 2014 for Australian Regional Patent Application No. 2012237974, AU Entry Date: Sep. 30, 2013, consisting of 3 pages.

English Translation of Chinese Official Action and Chinese Search Report dated May 20, 2015, for Chinese Serial No. 201280026244.6 filed Nov. 28, 2013 and Chinese Language Chinese Office Action and Chinese Search Report, consisting of 34 pages.

* cited by examiner

APPARATUS AND PROCESS FOR TESTING AN INDUSTRIAL GAS TURBINE ENGINE AND COMPONENTS THEREOF

CROSS-REFERENCE TO RELATED APPLICATIONS

This application is a Submission under 35 U.S.C. §371 for U.S. National Stage Patent Application of, and claims priority to, International Application Number PCT/US2012/029231, entitled APPARATUS AND PROCESS FOR TESTING AN INDUSTRIAL GAS TURBINE ENGINE AND COMPONENTS THEREOF, filed Mar. 15, 2012, which is related to and claims priority to U.S. Provisional Patent Application No. 61/468,771, entitled APPARATUS AND PROCESS FOR TESTING A COMPONENT OF A GAS TURBINE ENGINE, filed Mar. 29, 2011, U.S. Provisional Patent Application No. 61/587,022, entitled CAES COMBUSTOR TEST FACILITY, filed Jan. 16, 2012, U.S. Utility Patent Application No. 13/108,029, entitled APPARATUS AND PROCESS FOR TESTING AN INDUSTRIAL GAS TURBINE ENGINE, filed May 16, 2011, now expired, U.S. Provisional Patent Application No. 61/561,956, entitled APPARATUS AND PROCESS FOR TESTING AN INDUSTRIAL GAS TURBINE ENGINE, filed Nov. 21, 2011, U.S. Provisional Patent Application No. 61/569,378, entitled LOW NOX COMBUSTOR, filed Dec. 12, 2011, U.S. Utility Patent Application No. 13/410,051, entitled APPARATUS AND PROCESS FOR TESTING A COMPONENT OF A GAS TURBINE ENGINE, filed Mar. 1, 2012, the entirety of all of which are incorporated herein by reference.

FIELD OF THE INVENTION

The present invention relates generally to a system and a process for testing a component of a gas turbine engine, especially for a large aero or industrial gas turbine engine, and for a process for testing a large industrial gas turbine engine or component thereof that requires large flow capacity and pressure ratios.

BACKGROUND OF THE INVENTION

A large frame heavy duty industrial gas turbine (IGT) engine is typically used to drive an electric generator and produce electrical energy. These engines can produce over 200 MW of electric power. For example, a large frame industrial gas turbine engine may output almost 300 MW of electrical power. An IGT engine will have a compressor with multiple rows or stages of rotor blades and stator vanes, a combustor with multiple can combustors arranged in an annular array (also referred to as a can annular combustor), and a turbine with multiple rows of rotor blades and stator vanes. An aero engine typically has an annular combustor instead of multiple can combustors arranged in an annular array as in the IGT engines.

The largest hurdle to introducing new technologies into large frame power generation gas turbine engines is the risk that the new technology may fail during operation of the engine and result in tens of millions of dollars in equipment damage and possibly the cost of replacement electricity during the down time of the power plant. Because an owner of one of these engines is very reluctant to allow for the use of the engine in testing a new technology and, as a result, it is very difficult to introduce new technologies into a utility power generation plant, most power generation manufacturers have test facilities to test as much as possible the components prior to going into production. Unfortunately, the cost of test facilities and running the tests prohibits extensive testing and usually only allows for infant mortality issues to be discovered prior to installation of a new gas turbine engine at the utility site.

Testing a large IGT engine as a whole or testing a part or component of the engine is both very expensive and very difficult. When a large engine is tested, the power generated must be dissipated, such as by using the energy immediately or storing it for future use. One method of dissipating the energy produced is to use it to drive an electric generator. Energy produced from the electric generator can be supplied back into an electrical grid. However, engine testing might only last for a few hours. Supplying this large amount of electricity to the grid for a few hours and then stopping can cause significant problems for the power company, especially if the gas turbine engine gets tripped offline due to a problem during testing.

Another problem with testing industrial engines is that the cost to test is very high. In some IGT engine test beds, instead of using an electric generator to supply the resistance load, a water break or electrical heater resistors can be used to dissipate the load produced by the engine. These means of dissipating the load have advantages over the electrical power production described above in that a disturbance to the electrical grid is not produced. However, the disadvantage is that all of the energy produced is lost.

Testing the combustor or turbine component of a large aero or industrial engine requires a high flow rate of high-pressure air. Test times can last many hours, depending on the required warm-up time to achieve steady test conditions and the number of measurement points required for a complete data set. A typical facility is located in Cologne, Germany, operated by the German Aerospace Center (DLR). This facility provides flow rates and pressures that are limited by the size of the compressors at the facility. Therefore, large engine combustors are often tested in segments and large industrial gas turbine combustors are tested as individual cans. Full annular combustor testing for large engine or industrial gas turbines, even though desirable for combustor development, is not possible due to flow and pressure limitations at facilities such as DLR. Future component testing requires even higher flow and higher pressures, and to build a test facility with compressors large enough to supply the desired flow and pressure levels for multi-hour full annular testing would require a large capital investment, for example, as much as $400 million.

In a power plant that uses an IGT engine to drive a generator and produce electrical power, the electrical power required by the local community cycles from high loads (peak loads) to low loads such as during cool days or at night. One process to match electric supply with demand of an electrical power plant is to make use of compressed air energy storage (CAES) system. At these CAES facilities, during times of low loads, instead of shutting down an engine, the engine is used to drive a compressor instead of an electric generator to produce high pressure air that is then stored within as an underground cavern such as a man-made solution-mined salt mine cavern. The compressed air is then supplied to the combustor to be burned with a fuel and produce a hot gas stream that is passed through the turbine to drive the electric generator. This system replaces use of a compressor with use of the compressed air stored within the reservoir.

The conditions under which testing of these large engines and their components occurs should also be considered. When testing a gas turbine engine such as a large industrial engine or an aero engine or a component of one of these engines, the engine or component needs to be tested at different operating condition other than just the steady state condition. Engine partial load conditions must be tested, and such tests require different fuel and compressed air flows. Also, the loads on the engine vary during the testing process from a full load at the steady state condition to partial loads. Thus, the amount of energy dissipated varies during the engine testing process.

SUMMARY OF THE INVENTION

The present invention provides for a process and system for testing a gas turbine engine or a component thereof. The process includes providing a test object, at least one compressed air reservoir having a total volume of at least 10,000 m$^3$, at least a portion of the volume containing compressed air, placing the test object such that it is in fluid communication with the at least one compressed air reservoir, providing a heating device upstream of the test object and downstream of the compressed air reservoir, and directing the compressed air from the compressed air reservoir through the heating device and into the test object. The test object may be a gas turbine engine, a combustor, a compressor, a turbine, or combination thereof. The gas turbine engine may be an industrial gas turbine engine or an aero engine including high Mach engines such as scramjets. The heating device heats the compressed air from the compressed air reservoir to a temperature of between approximately 300° C. and approximately 900° C. before the compressed air enters the test object. For testing high Mach engines, temperatures of more than 2000° C. may be required for the air that enters the test object.

The process may further include providing a heat exchange device having a first flow path and a second flow path, the first and second flow paths being in thermal communication with each other, directing compressed air from the compressed air reservoir to the first flow path, directing compressed air from the first flow path to the test object, and directing compressed air from the test object to the second flow path. The process may further include providing a heater upstream of the test object may also be included, which further heats the compressed air form the first flow path before the compressed air enters the test object. The heater and heat exchange device may together heat the compressed air from the compressed air reservoir to a temperature of between approximately 300° C. and approximately 900° C. before the compressed air enters the test object. The heating device may be an electric heater, plurality of electric heaters arranged in a series, a gas-powered heater, a plurality of gas-powered heaters arranged in a series, a heat exchange device, a thermal storage device, a high pressure combustion heater, or a combination thereof.

The process may further include providing an air compressor downstream of the test object, operating the test object, the test object providing energy to the compressor to produce compressed air, and storing the compressed air in the at least one compressed air reservoir. The compressed air has a pressure of between approximately 10 bars and approximately 200 bars. Further, the at least one compressed air reservoir may include a low-pressure, a medium-pressure, and a high-pressure compressed air reservoir, used for testing test objects under various conditions. The low-pressure reservoir may contain compressed air at between approximately 10-20 bars, the medium-pressure reservoir may contain compressed air at between approximately 20-50 bars, and the high-pressure reservoir may contain compressed air at between approximately 50-200 bars.

The facility for testing a gas turbine engine or component thereof includes one or more compressed air reservoirs having a total volume of approximately 10,000 m$^3$ to approximately 1,000,000 m$^3$, one or more air flow paths in fluid communication with the one or more compressed air reservoirs, and a heating device downstream of the one or more compressed air reservoirs being in thermal communication with at least one air flow path. The testing facility may further include a testing chamber having a first end and a second end, the first end being in fluid communication with the compressed air storage reservoir, a vacuum chamber in fluid communication with the second end of the testing chamber, and a vacuum pump in fluid communication with the vacuum chamber, wherein a directional air flow is generated in the testing chamber from the first end to the second end from at least one of the vacuum chamber and the compressed air reservoir. The compressed air reservoir contains at least some compressed air, the heating device heating the compressed air from the compressed air reservoir in at least one air flow path to a temperature of between approximately 300° C. and approximately 900° C. The testing facility may further include a heat exchange device having a first flow path and a second flow path, the first flow path and the second flow path being in thermal communication with each other, and the first flow path being upstream of the heating device and the second flow path being downstream of the heating device.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1A:
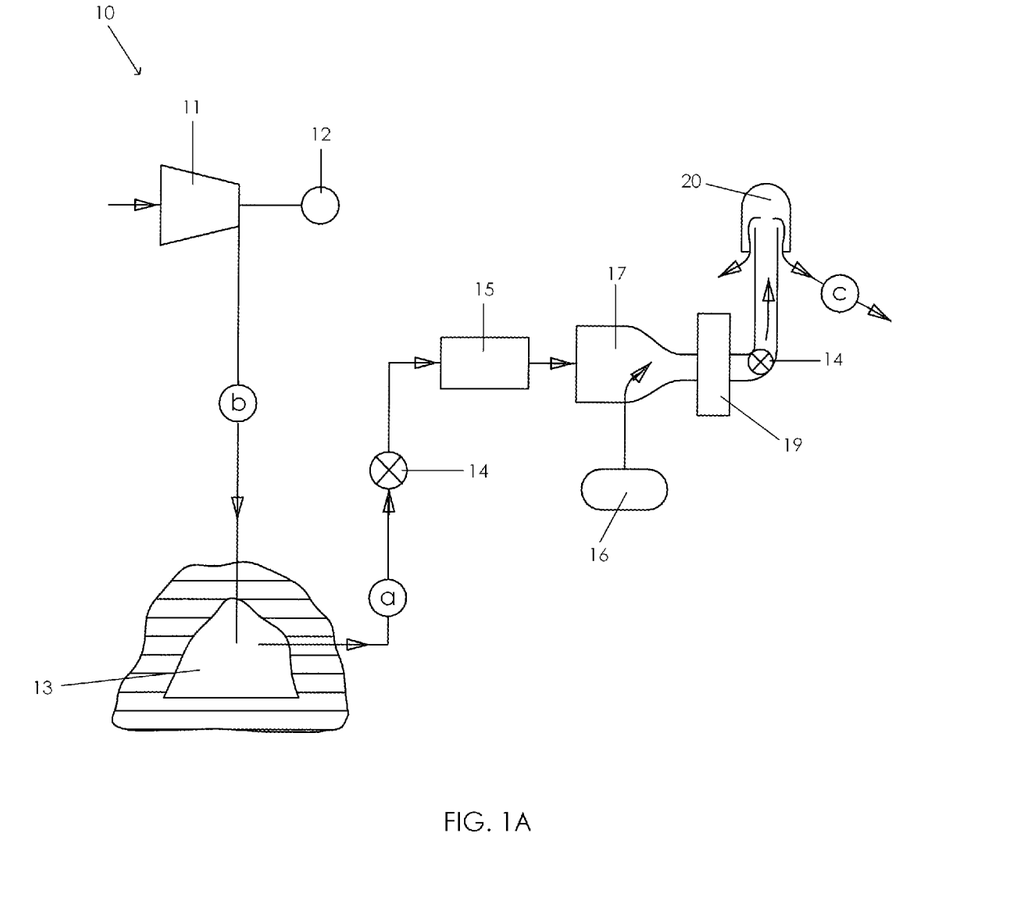
FIG. 1A shows a first schematic view of a gas turbine engine component test facility using an underground compressed air reservoir.

Referring now to FIG. 1A, a test facility 10 and a process for testing a turbine component module or combustor component module for an industrial or aero gas turbine engine is shown. The facility may generally include a compressor 11, into which non-compressed air may flow (air flow is indicated throughout the figures by arrows) by which compressed air may be produced (air flow path (b)). The compressor 11 may be driven by a motor or engine 12. The compressed air is stored within a large compressed air storage reservoir 13, which is a man-made underground cavern, and used to supply the high flow rate and pressure required for testing an engine or component module (which may be referred to herein as a "test object 17") under normal engine operating conditions (air flow path (a)). The compressed air storage reservoir of the present invention is a single volume storage reservoir of at least 10,000 m$^3$ in size and not formed from a number of smaller reservoirs. The compressor 11 may be small in relation to the compressor used on the actual gas turbine engine in which the combustor is being tested (for example, one-third the size), which also may reduce the overall cost of the facility. Also, since the compressed air storage reservoir 13 may be filled over a period of time, the compressor 11 can be operated for several days to fill the storage reservoir 13 with enough compressed air for the next test to be performed. The motor or engine 12 may be an electric motor (or a gas or diesel powered engine can be used) or a small gas turbine engine, which may drive the compressor 11.

The compressed air storage reservoir 13 may be used to store compressed air from the compressor 11, and is located underground due to its large volume requirements. For example, the storage reservoir 13 may be a pre-existing man-made underground storage facility such as a mined salt cavern, or can be formed from a salt mine using a solution to create a cavity within the salt bed or salt dome capable of storing compressed air for engine or component module testing. A natural underground cavern by itself would not be capable of storing high pressure air useful for testing a gas turbine engine component without additional structural considerations, for example, the withstanding of high pressures of approximately 200 bar and the prevention of high-rate leaks. Or, if the engine testing facility is located at a CAES facility, the storage reservoir for the CAES facility can be used as the compressed air source for the engine or engine component testing. For simplicity, the compressed air storage reservoir 13 is depicted as a plenum surrounded by rock. The compressed air storage reservoir 13 must be capable of storing enough compressed air at a high pressure (for example, 50-200 bar) and high flow rate (for example, in excess of 100 kilograms per second) so that the combustor can be properly tested. For example, hundreds of test hours are required in the development process to properly adjust the combustor such that stable operation can be achieved at low emissions levels. Typical test durations for a combustor are approximately two to twelve hours. As a non-limiting example, the compressed air storage reservoir 13 may be capable of holding a volume of compressed air of over 10,000 m$^3$ at a pressure of up to approximately 200 bar. The largest air storage facility used for aerodynamic testing today is the NASA Langley Research Center's 8-Foot High Temperature Tunnel in Hampton, Va., which uses a number of high-pressure compressed air storage containers connected together for a total storage volume of 39,000 ft$^3$ (1,104 m$^3$) field rated at 6,000 psig. This system is connected to an additional 6,000 psig storage field having a volume of 14,000 ft$^3$ (396 m$^3$), giving a total available volume of 53,000 ft$^3$ (1,500 m$^3$). This facility is used for testing high Mach number test vehicles and scramjets. Due to the required high air flow requirements but limited compressed air storage capacity, the test times are limited to less than two minutes.

The test facility 10 may further include one or more air pressure regulator valves 14 to control the pressure of the air as it exits various components of the facility 10 (for example, the storage reservoir 13 or test object 17), a heating device 15 to heat the compressed air flowing from the reservoir 13 to a temperature that would normally be passed into the combustor, turbine component, or other component of a gas turbine engine, a fuel source 16 such as natural gas, hydrogen, or jet fuel to be burned with the compressed heated air, one or more test objects 17 (for example, a combustor 18 and a diffuser or turbine 19) each having an inlet and an outlet. The heating device 15 (which may include one or more heaters) are used to preheat the relatively cold compressed air from the storage reservoir 13 to a temperature that would simulate the outlet from a compressor that would normally be used to supply the compressed air to the engine component to be tested. Although not shown in FIG. 1A, an exhaust discharge device 20 may be used to discharge the combustor exhaust (air flow path (c)). One air pressure regulator valve 14 may be positioned to control the release of the compressed air from the storage reservoir 13 that will flow into the test object 17, and/or another air pressure regulator valve 14 may be positioned to control the release of the air exiting the test object 17. Further, one or more water injection ports (not shown) may be included at or near the outlet of the test object 17 to cool the hot air exiting the test object 17 from damaging the pressure regulator valve 14 downstream of the test object 17.

A heating device 15 may be used to heat the air before it enters the test object 17. The compressed air released from the storage reservoir 13 may be relatively cold air. For example, CAES facilities typically store air at a temperature of 50° C. or lower. Because combustor module testing requires the compressed air to be at a temperature of between approximately 300° C. to approximately 900° C., the heating device 15 may be used to heat the compressed air at the storage reservoir temperature to an appropriate temperature for testing. The heating device 15 shown in FIG. 1A may be an electric or gas-powered heater, but any of several heating devices may be used, such as one or more electric or gas-powered heaters, a heat exchanger (as shown and described in FIG. 1B), a heat storage device (as shown and described in FIG. 7), or a high pressure combustion heater. A high pressure combustion heater (as shown and described in FIG. 1C) may combust a fuel source 16 with compressed air, which may require a smaller heater than would otherwise be needed if atmospheric air were combusted. Any of these heating devices 15 may be included in the facility 10 either alone or in combination with another heating device 15, as long as the compressed air is sufficiently heated to a temperature optimal for testing an engine or engine component. The test facility 10 may contain one or more temperature and/or pressure sensors (not shown) for measuring operational parameters of any component of the facility 10. These parameters may be adjusted using one or more valves, levers, knobs, buttons, user input devices (such as a computer or keyboard), displays, or other devices for regulating such parameters as temperature, pressure, flow rate, and test object operation.

For example, if electric or gas-powered heaters are used, the heaters may be arranged in a series to incrementally warm the air, with one or more (perhaps less expensive) heaters warming the cold air exiting the compressed air storage reservoir 13 and one or more (perhaps more expensive, because of the materials required to handle the high temperatures) heaters bringing the pre-warmed air up to very high temperatures (for example, approximately 700° C. to approximately 900° C.). As another non-limiting example, an electric or gas-powered heater may be used in addition to a heat exchange device, such that the electric or gas-powered heater is optionally used to adjust as necessary the temperature of the air after before it enters the test object 17.

The test facility 10 may be used to test various types of combustors of modem day engines, such as those that use the can-annular combustor, those that use the annular combustor, and silo combustors. The combustor testing can be performed without burning a fuel in the combustor, or can be tested under normal operating conditions by burning the fuel as normal within the combustor by injecting the fuel through the injectors and into the combustor to be burned with the compressed air from the storage tank 13. Aero engines typically use an annular combustor, whereas industrial engines may use an annular arrangement of can combustors commonly referred to as a can-annular combustor. To reduce the air flow requirement when testing can-annular and annular combustors, only a small section of the combustor may be used in prior art facilities because of the lack of flow capacity at the existing testing facilities, including the DLR facility in Cologne, Germany, and the NRC Gas Turbine Lab in Ottawa, Canada. However, error is produced when testing of only a section of the combustor. To produce a full and accurate test of the combustor, the entire combustor must be tested for flow. For the silo type combustor, this combustor cannot be sectioned so that a portion of the combustor can be flow tested that would represent the entire combustor. To test the silo type combustor or the aero annular combustor, the entire combustor should be flow tested and therefore a high flow rate is required. With the tremendous storage capability of the underground storage reservoir system of the test facility 10 described herein, the optimal full testing of the combustors of any type can be performed using the required high flow rates (such as 100-400 kg/s or more) and pressures without the high cost of the large compressors used in the prior art engine testing facilities. Because of the much larger storage volume of the underground mined salt cavern, the engine component can be tested for a long period of time, for example, up to several days. For example, some combustor components require longer periods of time for verifying endurance and durability parameters. A multi-use scramjet engine may require a few hundred hours of total test time to qualify the engine system performance and durability. The prior art testing facilities that use multiple smaller compressed air containers can only support a testing time of a few minutes.

With the combustor test facility as described and shown in FIG. 1A, even an older combustor from an older engine can be tested in order to improve the combustor performance. The older engines that used the silo type or annular type combustor would be ideal for use with the economically efficient testing facility 10. Further, modifications to the combustor can be implemented and then tested at a lower cost, making such improvements more cost effective than previously possible.

Figure 1B:
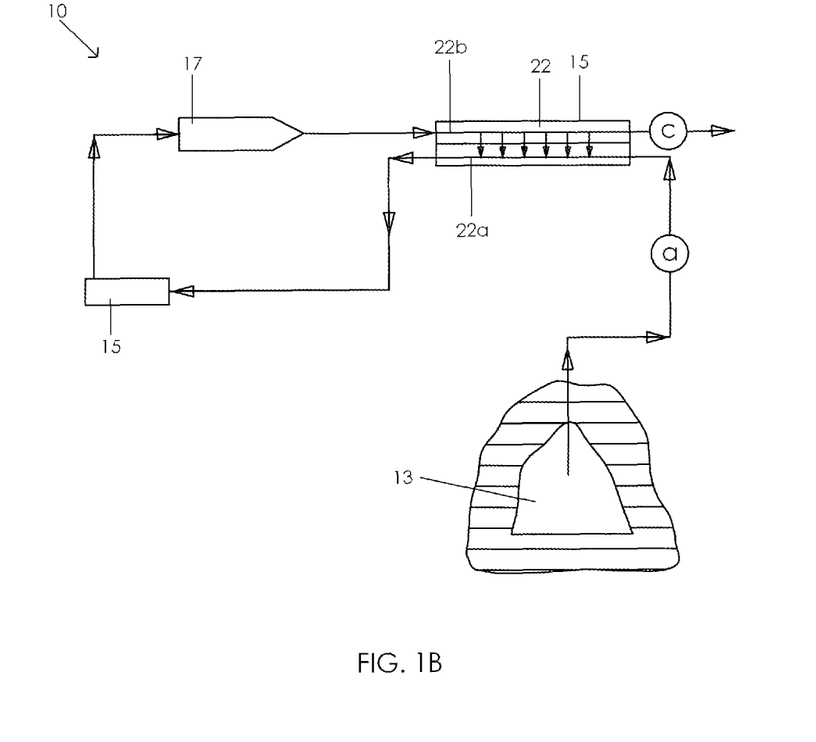
FIG. 1B shows a second schematic view of a gas turbine engine component test facility using an underground compressed air reservoir.
Figure 1C:
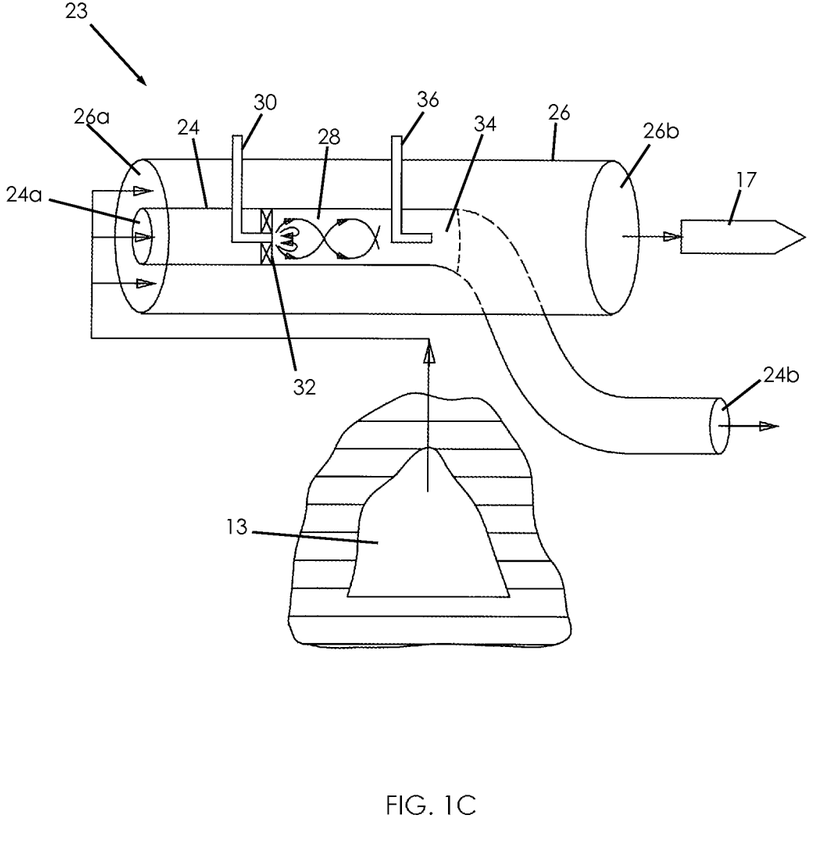
FIG. 1C shows a schematic view of an embodiment of a heating system.

Referring now to FIG. 1B, the facility 10 is shown, with an alternate embodiment of the heating system. As shown and described in FIG. 1A, a heating device 15 or combination of heating devices may be used upstream of the test object 17 (such as a combustor as shown in FIG. 1C) to heat the compressed air flowing from the storage reservoir 13 (air flow path (a)) to a temperature (simulating the temperature output from an actual compressor) that would normally be passed into the combustor of an actual engine. Accordingly, the test facility 10 may further include a heat or thermal exchange device 22. In such a configuration, compressed air from the storage reservoir 13 and hot air discharged from the test object 17 each pass through a flow path 22$a$, 22$b$ in the heat exchange device 22 and are in thermal communication with each other. These flow paths 22$a$, 22$b$ may direct air in the same direction or in opposite directions (counter-flow paths). The temperature of the air in the first flow path 22$a$ may be thermally affected by the temperature of the air in the second flow path 22$b$, which may be determined by the operation of the test object 17 (such as oscillation due to quick transience of a combustor). For example, at low combustor firing temperatures, the temperature of the air in the second flow path 22$b$ may not be sufficient to warm the air in the first flow path 22$a$ to an appropriate temperature. Therefore, a heating device 15 such as an electric or gas-powered heater may be required to adjust the temperature of the air exiting the first flow path 22$a$ of the heat exchange device 22 before the air enters the test object 17.

As a non-limiting example, compressed air may be stored in the reservoir 13 at a pressure of approximately 72 bar and a temperature of approximately 50° C. This compressed air may pass from the storage reservoir 13 through the heat exchange device 22 (through the first flow path 22$a$) at, for example, a flow rate of 100 kg/s. Within the heat exchange device 22, the compressed air from the storage reservoir 13 may be heated by the hot air that is discharged from the test object 17 (such as a combustor 18, as shown in FIG. 1B). Once the compressed air exits the heat exchange device 22 as hot air, the hot air may have a pressure of approximately 68 bar and a temperature of approximately 700° C. The hot air may then pass through a heating device 15 (such as an electric or gas-powered heater) that may adjust the temperature (and decrease the pressure) of the hot air, for example, to approximately 900° C. at a pressure of approximately 66 bar. After passing through the heater 15, the hot air may then pass into the test object 17, where a fuel may be added (at, for example, 3 kg/s) to produce a hot gas stream that exits the test object 17 at a temperature of, for example, approximately 2,000° C. at a pressure of approximately 56 bar. This hot air exiting the test object 17 may then pass through the heat exchange device 22 (though the second flow path 22$b$), where it heats the compressed air coming from the storage reservoir 13, also flowing through the heat exchange device 22. That is, the compressed air within a first flow path 22$a$ may be thermally affected by the hot air within a second flow path 22$b$ within the heat exchange device 22. Additionally, the hot air exiting the heat exchange device 22 (air flow path (c)) may be cooled from, for example, approximately 2,000° C. to a temperature safe for the exhaust discharge means used (for example, an exhaust discharge device 20 as shown in FIG. 1A). Cooling of the hot air may occur because of the thermal effect on the second flow path 22$b$ by the cooler compressed air within the first flow path 22$a$. It will be understood that these pressures, temperatures, and flow rates could vary depending on the test object 17, the storage reservoir 13, used, heating device 15 used, etc.

Referring now to FIG. 1C, a high pressure combustion heater 23 is shown. The high pressure combustion heater 23 may include an inner conduit 24 positioned within an outer conduit 26 through which compressed air from the compressed air storage reservoir 13 may be passed. The air may be passed through both the inner conduit 24 and outer conduit 26 in parallel, that is, toward the same direction, or in a counter-flow direction. The conduits 24, 26 may each have an inlet end 24$a$, 26$a$ and an outlet end 24$b$, 26$b$. Further, the conduits 24, 26 may be coaxial and tubular (circular in cross section), but may have any shape as long as the compressed air can flow from the inlet end to the outlet end.

The inner conduit 24 may include a first combustion zone 28 having a first fuel injector 30. The first combustion zone 28 may not be a self-igniting combustion zone, and may include a flame holder or a recirculation zone 32 in order to maintain the combustion within the chamber of the inner conduit 24. In one embodiment, the temperature of the first combustion zone 28 may be approximately 1,120° C. The inner conduit 24 may further include a second combustion zone 34 having a second fuel injector 36 and being located downstream of the first combustion zone 28 and first fuel injector 30. The second combustion zone 34 may be a self-igniting combustion zone because the flow of hot compressed air from the first combustion zone 28 may be hot enough to auto-ignite the fuel. In one embodiment, the temperature of the second combustion zone 34 may be approximately 1,120° C. The second combustion zone 34 can be cooler than the first combustion zone 28 because the cooler air passing through the outer conduit is being heated by the hot gas flow from the two combustion zones 28, 34. The hot gas passing through the inner conduit 24 is used to preheat the colder compressed air from the storage reservoir 13 passing through the outer conduit 26 and then into the test component 17 (for example, a combustor). The hot gas stream does not mix with the preheated compressed air from the storage reservoir 13, but rather is discharged from the high pressure combustion heater 23 at outlet 24b (air flow path (c)). This keeps the oxygen content of the compressed air from the reservoir 13 high for use in testing the test component 17 (for example, a combustor). The combusted gas flow from the inner conduit is low or without oxygen and thus is not discharged into the test component 17.

In one embodiment, approximately 30% of the total compressed air from the compressed air storage reservoir 13 may flow through the inner conduit 24 and through the first and second combustion zones 28, 34. The remaining approximately 70% of the compressed air may flow through the outer conduit 26 and be heated from the hot compressed air flow in the inner conduit 24. For example, the outer conduit 26 may have a diameter that is between approximately 50% larger than the inner conduit 24 to achieve this flow of disparate volumes of compressed air through the inner and outer conduits 24, 26. Additionally or alternatively, the inlet ends 24a, 26a of the inner and outer conduits 24, 26 could include one or more baffles or the like to direct the appropriate volume of compressed air to each of the inner and outer conduits 24, 26. The inner conduit 24 may be composed of a high thermal conductive material (for example, most high-temperature-resistant nickel alloys) in order to promote a high heat transfer rate to the outer conduit 24.

Figure 2:
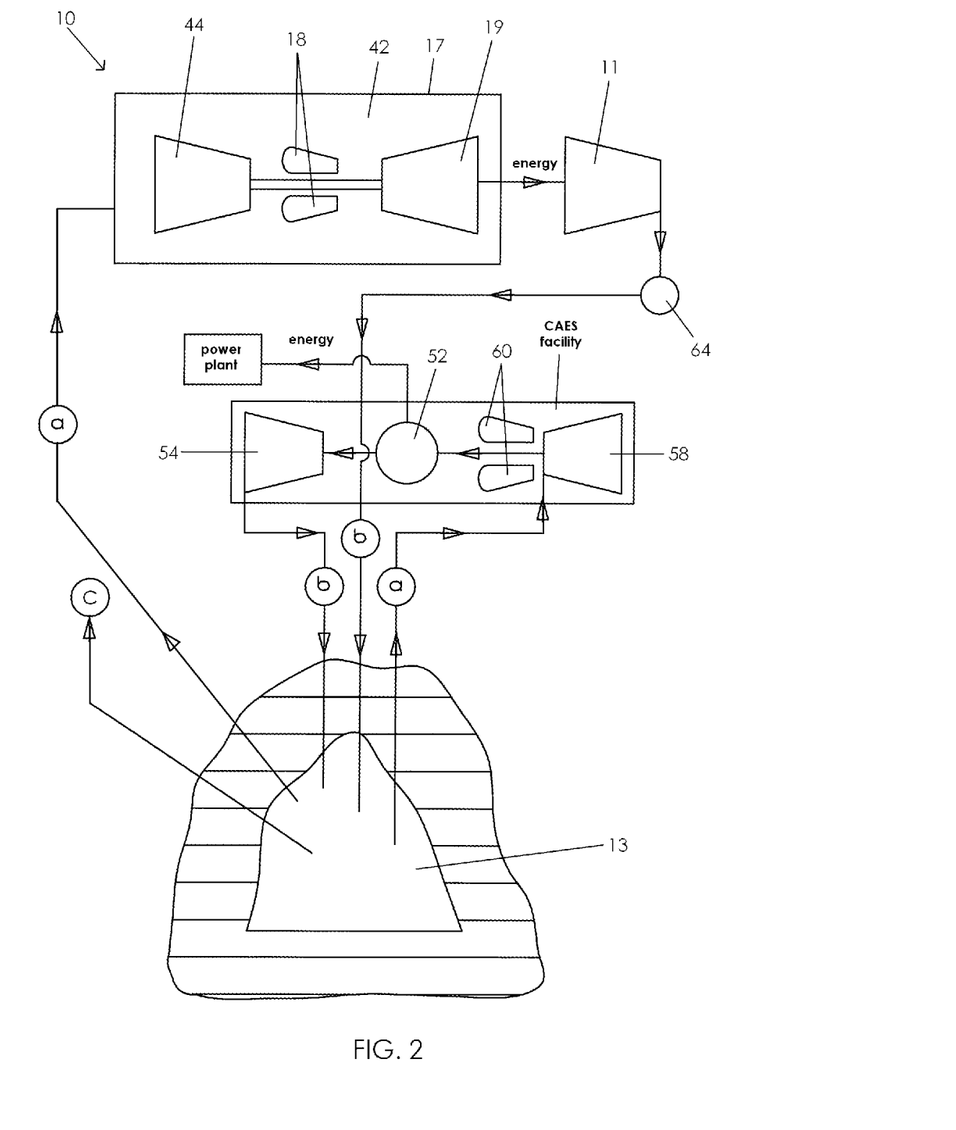
FIG. 2 shows a schematic view of a compressed air energy storage facility with a gas turbine engine located nearly for testing of the engine or for testing a component of a gas turbine engine of the present invention.

Referring now to FIG. 2, the test facility 10 may be established close to a compressed air energy storage (CAES) facility so that the during testing the engine may supply the CAES facility with compressed air, or the CAES facility can supply the engine testing facility with compressed air for the testing of an engine or component thereof. In other words, the CAES facility and the testing facility 10 may share a compressed air storage reservoir 13, each contributing compressed air to or using compressed air from the same storage reservoir 13 (air flow paths (a) and (b)). Further, the compressed air storage reservoir 13 of a typical CAES facility may be of a suitable size to store and supply enough compressed air for testing large engines or components thereof for a length of time in excess of what is currently available. For example, a CAES storage reservoir 13 may accommodate over 10,000 m$^3$ (for example, up to approximately 1,000,000 m$^3$) of compressed air at a pressure of up to 200 bar, a supply that is efficient to test a large engine for several hours to a few days, instead of only a few minutes. Further, a CAES facility may operate at a minimum pressure of 20 bar and a maximum pressure of 100 bar. However, it is contemplated that non-CAES compressed air storage reservoirs 13 (or future CAES compressed air storage reservoirs) may accommodate compressed air having a pressure of up to 200 bar.

FIG. 2 shows a non-limiting example of collaboration between a CAES facility and testing facility 10, with a CAES facility being in communication with a power plant and located next to a large mined cavern or old salt mine that can be used as a compressed air storage reservoir 13. The test object 17 may be an engine 42 such as a large industrial gas turbine engine that includes a compressor 44, a combustor 18, and a turbine 19 to produce mechanical work that is used to drive a compressor 11 to fill the compressed air storage reservoir 13. Alternatively, the test object 17 may be a component of a gas turbine engine such as a combustor or a turbine. The compressor 11 may provide a load to the engine during testing.

The CAES facility may generally include an electric motor/electric generator 52 to drive a compressor 54 to resupply the compressed air storage reservoir 13 with compressed air. Alternatively, the compressed air stored within the storage reservoir 13 may be used to drive a turbine 58 which drives the electric generator 52 to produce electrical energy for the power grid. An optional combustor 60 can be used to burn the compressed air from the reservoir with a fuel and produce a hot gas stream that is then passed through the turbine 58 to produce electric energy from the generator 52. For example, at low demand for electrical power, the CAES facility may be used to drive a compressor 54 to produce compressed air to be stored within the storage reservoir 13. Therefore, the load is not wasted but is instead converted into compressed air for storage in the reservoir 13. At peak demand, the stored compressed air then may be supplied to the power plant.

The test facility 10 shown in FIG. 2 may further include various air pathways. Air flow path (a) represents a flow path by which compressed air is directed from the storage reservoir 13 (for example, to be used by the power plant associated with the CAES facility or to be recycled back into the test object 17 for further testing). Air flow path (b) represents a flow path by which compressed air is delivered to the storage reservoir 13 (for example, compressed air generated by the CAES facility or the test object 17). Air flow path (c) represents air being vented away from the test facility 10 or otherwise dissipated. Further, an air flow valve 64 may be used to prevent compressed air from discharging from the storage reservoir 13 back into the compressor 11.

A CAES facility as currently operated in McIntosh, Ala. or Huntorf, Germany is sufficient for a large engine test facility 10. Additionally, a source of hydrogen production is available at the McIntosh, Ala., CAES facility, which could be used for testing of hydrogen combustors. The association between the testing facility 10 and a CAES facility not only may reduce the costs associated with the construction and maintenance of the testing facility 10, but may also contribute valuable energy to the CAES facility and its associated power plant. Therefore, the efficiency of both facilities may be improved. Additionally, because the testing facility 10 is not connected to the electrical grid, there will be no effect on the electrical grid if the gas turbine being tested trips.

However, even though it may be beneficial to establish a testing facility 10 in association with a CAES facility, it is not necessary to do so. Alternatively, a compressed air storage reservoir 13 of sufficient size may be constructed from an underground cavern (and made capable of containing high pressures with limited leakage). The compressed air storage reservoir 13 would ideally be of such a size (for example, between approximately 10,000 m$^3$ and approximately 1,000,000 m$^3$) that would allow for a large industrial or aero gas turbine engine to be tested for a long period of time, such as a few days. The storage reservoir 13 may also, in turn, be able to store a significant amount of the compressed air generated from testing. The stored compressed air may then be recycled into the facility 10 for further engine or component testing.

Additionally or alternatively, the compressed air could be used for other industrial applications in addition to power generation.

Whether the compressed air storage reservoir 13 is part of a CAES facility or is constructed, the large volume of the reservoir or, indeed, several smaller reservoirs in fluid communication with each other (having a total volume of, for example, approximately 10,000 m$^3$ to approximately 1,000,000 m$^3$), allows for the use of a much smaller compressor 11 for producing the compressed air than in the prior art engine test facilities. For example, the compressor 11 can be one-third of the size normally required to supply this large of a volume of compressed air, and the smaller compressor 11 may be operated for a longer period of time (for example 72 hours) to supply the required volume and pressure of compressed air in the storage reservoir 13. Thus, the cost of the facility 10 may be significantly reduced because a larger and more expensive compressor is not required to produce a sufficient volume of compressed air for testing.

Figure 3:
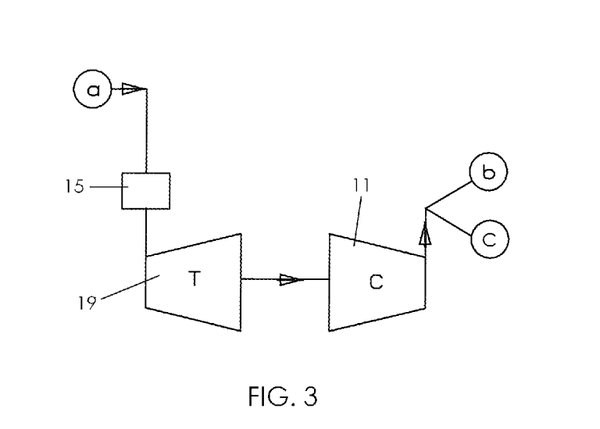
FIG. 3 shows a schematic view of a turbine component of an engine for testing according to the present invention.
Figure 4:
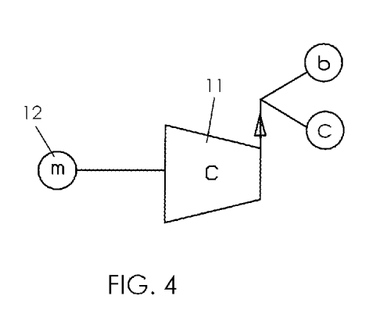
FIG. 4 shows a schematic view of a compressor component of an engine for testing according to the present invention.
Figure 5:
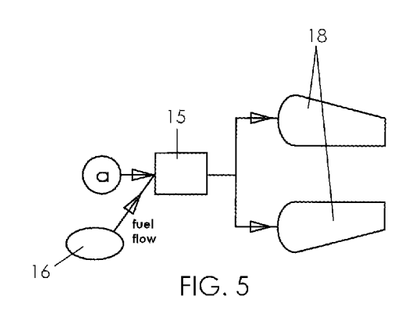
FIG. 5 shows a schematic view of a combustor component of an engine for testing according to the present invention.

Referring now to FIGS. 3-5, a single engine component may be used as a test object 17. FIG. 3 shows a simplified schematic representation of a method for testing a turbine 19; FIG. 4 shows a simplified schematic representation of a method for testing a compressor 11; and FIG. 5 shows a simplified schematic representation of a method for testing a combustor 18. For any of these methods, the large volume and high pressure (for example, approximately 10,000 m$^3$ to approximately 1,000,000 m$^3$ and up to approximately 200 bar) compressed air may be supplied from the compressed air storage reservoir 13 of a CAES facility or a man-made storage reservoir of sufficient size and structural characteristics. Therefore, a large capital investment in equipment and a building is not required (for example, the required infrastructure may already exist at a CAES power plant). It has been estimated that a new compressor facility capable of supplying these pressures and volumes of compressed air for testing an engine combustor would cost approximately $400 million.

Referring now to FIG. 3, compressed air from the storage reservoir 13 may be used to drive a turbine module 19 for testing. Air flow path (a) represents an air flow path by which stored compressed air may be supplied into the testing facility 10 from a storage reservoir 13. An optional combustor (not shown) may also be used to produce a hot gas stream that is passed through the turbine to recreate a normal operating condition. A compressor 11 may be driven by the turbine 19 during testing and used to provide a load on the turbine 19 during testing. This in turn may produce compressed air that can be resupplied to the storage reservoir 13. Air flow paths (b) and (c) represent an air flow paths by which compressed air generated by the testing may be supplied to the storage reservoir 13 or for other use. Further, one or more heating devices 15, such as described and shown in FIGS. 1A and 1B, may be used to heat the compressed air coming from the storage reservoir 13 before the compressed air enters the turbine 19. For example, compressed air may be stored in a CAES facility storage reservoir 13 at a temperature of 50° C. and below. The one or more heating devices 15 may be used to heat the air to an optimal temperature for use in testing, for example, between approximately 300° C. and approximately 900° C. Before the compressed air from the storage reservoir 13 enters the test object 17, the temperature and pressure characteristics of the compressed air should simulate the characteristics of compressed air that would be passed into a combustor from a compressor in a gas turbine engine in real-world conditions.

Referring now to FIG. 4, a compressor 11 may be tested under normal operating conditions for a long period of time (for example, several hours to a few days). The compressor 11 may be driven by a motor or engine 12, such as an electric or gas-powered motor, and generate compressed air that is then stored within the compressed air storage reservoir 13 or put to other use (air flow paths (b) and (c)).

Referring now to FIG. 5, a combustor 18 may be tested using compressed air from the storage reservoir 13 (air flow path (a)). One or more heating devices 15 may be used to pre-heat the compressed air before it enters the combustor 18, and fuel may be mixed and burned with the compressed air within the combustor 18 for the test process. Multiple types of heaters can be used together, including externally fired heaters or electric heaters. Optionally, a gaseous fuel source 16 may be used (for example, gaseous fuels such as CH4 or H2). The fuel can be compressed along with air from the compressed air storage reservoir 13 and then used, for example, to test the combustor 18 by passing compressed air and fuel into the combustor 18 and ignited. The resulting hot gas stream may then, for example, be passed through a turbine 19 for testing, as shown in FIG. 3. A major benefit of the present invention over the prior art testing facility that uses multiple smaller compressed air storage containers like the NASA Langley facility is that longer periods of high Mach number testing can be performed. The NASA Langley facility can only perform high Mach number tests for less than two minutes because of the limited compressed air storage capability. With the large underground storage reservoir of the present invention, a large volume of compressed air at the required pressure can be supplied for the long periods of time required for adequate high Mach number testing of, for example, an airframe design).

Figure 6:
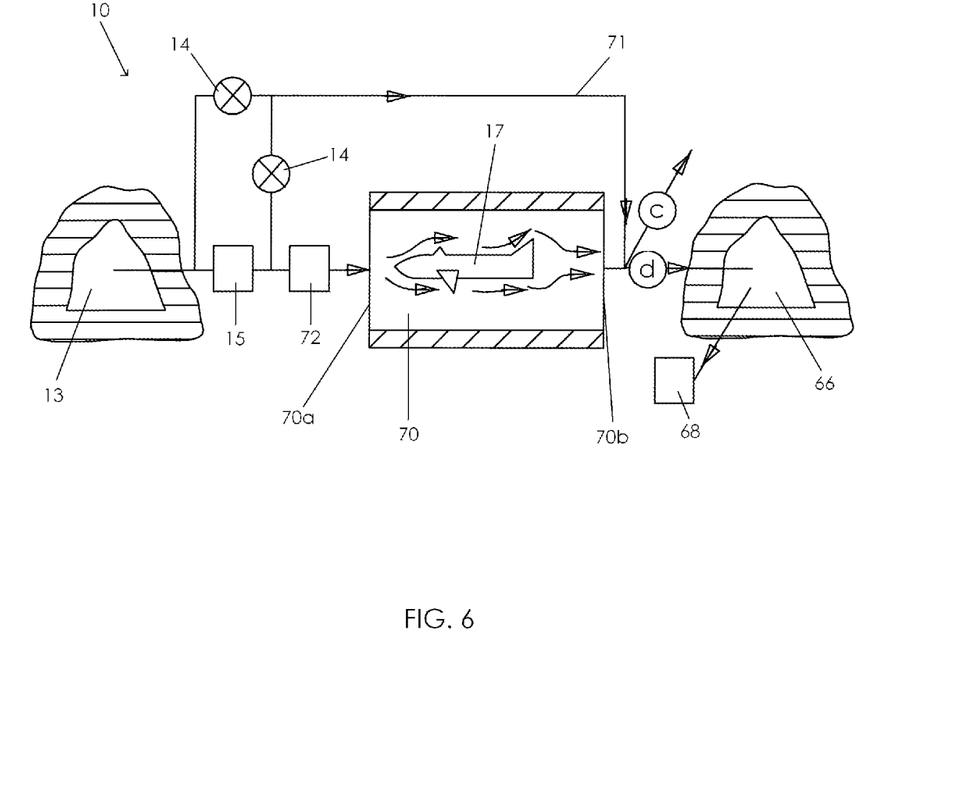
FIG. 6 shows a schematic view of an aero vehicle or aero component within an air tunnel for testing according to the present invention.

Referring now to FIG. 6, specialty tests, such as aerodynamic testing in a wind tunnel or high Mach number testing (such as hypersonic Mach testing and testing of up to Mach 10), may be performed using the testing facility 10 with a low capital equipment cost. In one example, as shown in FIG. 6, a vacuum chamber 66 associated with a vacuum pump 68 may be used in addition to the compressed air storage reservoir 13. The vacuum chamber 66 may be similarly constructed to the compressed air storage reservoir 13 and may be of a similar size. That is, the vacuum chamber 66 may be man-made (such as by solution mining) The vacuum pump 68 may gradually (for example, over the span of one week) create very low pressure within the vacuum chamber 66, so that that chamber 66 may be almost entirely or entirely devoid of air by the time a vacuum is required for testing. Similar to the compressor, the vacuum pump 68 may be relatively small, such as being able to provide approximately 1% to approximately 15% of the vacuum pressure actually needed for testing. This is because the large vacuum chamber 66 may function as a vacuum. Air flow path (d) represents a flow path by which air exits the wind tunnel 70 and flows into the vacuum chamber 66. The large volume of air from the vacuum chamber 66 may be used to vary a pressure for the high Mach number testing of aircraft or engines in a wind tunnel with a low capital equipment cost. The vacuum chamber 66 used for high Mach number testing may be of a size to provide enough air flow at a sufficient speed to produce an air flow of up to Mach 10. However, the test facility 10 may also be capable of high Mach number testing without including a vacuum chamber 66 or vacuum pump 68.

In order to conduct aerodynamic testing of an engine, component thereof, or an entire aircraft or other vehicle, a wind tunnel 70 having an inlet 70a and outlet 70b may be used. For example, compressed air may either be supplied (air flow path (a)) to the inlet end 70a of a wind tunnel 70 (or similar type of chamber sized to contain a large object being tested) from the storage reservoir 13 and discharged from the outlet end 70b of the wind tunnel (air flow path (c)). Alternatively or additionally, air may be pulled from the wind tunnel 70 into the vacuum chamber 66 (air flow path (d)) at an outlet end 70b. Alternatively or additionally, a bypass line 71 may be used in association with a flow ejector 72 and one or more regulator valves 14. The bypass line 71 may take the place of a vacuum chamber 66 and vacuum pump 68 so that the vacuum chamber 66 and the vacuum pump 68 are not needed for the testing. The wind tunnel 70 may include an inlet valve and an outlet valve (not shown) to control the amount of compressed air entering the inlet end 70a and/or the amount of air removed by the vacuum chamber 66 at the outlet end 70b. The bypass line 71 is in fluid communication with the exhaust line (air flow path (c)) from the outlet end 70b of the wind tunnel 70, and does not supply air to the wind tunnel 70 (such as through the inlet end 70a). As the compressed air flows from the bypass line 71 into air flow path (c), any compressed air within the wind tunnel 70 (as supplied from the storage reservoir 13 through air flow path (a)) will be drawn out of the wind tunnel 70 and into air flow path (c), much to the same effect as using the vacuum chamber 66 and vacuum pump 68. Because of the large size of the storage reservoir 13 of at least 10,000 m$^3$, a large amount of compressed air may be used to supply the high Mach number air to the wind tunnel for testing the aero component at these high Mach numbers for long periods of time that cannot be accomplished using the prior art test facility with the numerous compressed air bottles. A heater to heat the compressed air to the proper temperature for testing high Mach numbers can also be used and located between the compressed air storage reservoir 13 and the entrance to the wind tunnel 70.

Figure 7:
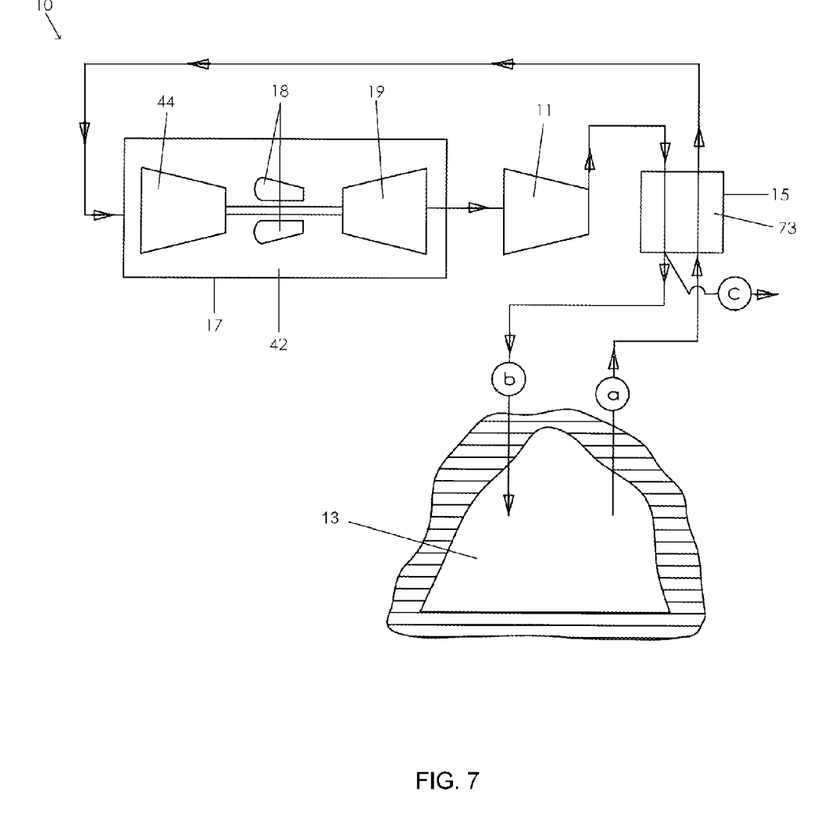
FIG. 7 shows a schematic view of an engine testing facility of the present invention with a thermal heat storage device.

Referring now to FIG. 7 an alternative embodiment of the testing facility 10 is shown. The heating device 15 may be a thermal storage device 73 used to store heat from the hot compressed air produced in the compressor 11 as it passes into the compressed air storage reservoir 13 (air flow path (b)) or as it is vented or otherwise dissipated (air flow path (c)). Additionally or alternatively, the thermal storage device 73 may be used to store heat from the hot compressed air as it is vented from the facility 10. The thermal storage device 73 may be composed of a material having a high heat capacity and high thermal conductivity. The material may be a solid or semi-solid, or phase-change material, such as alumina, $ZnCl_2$+KCl, $NaNO_3$, $KNO_3$, MgCl+NaCl, or NaCl. Heat from the hot compressed air may stored in the thermal storage device 73 and later used to warm the compressed air for testing as it passes through the thermal storage device 73 from the compressed air storage reservoir 13 (air flow path (a)) to the test component 17. The thermal storage device 73 may be used in addition to another heating device 15 such as an electric or gas-powered heater or a heat exchange device 22 (not shown in FIG. 7). Further, the thermal storage device 73 may function as an electric or gas-powered heater or heat exchange device, or it may be used to adjust as necessary the temperature of the air entering the test object 17. The test object 17 may be, for example, an engine 42 having a compressor 44, combustor 18, and turbine 19, which may supply energy to the compressor 11. Or, the test object 17 may be component of the engine 42.

Figure 8:
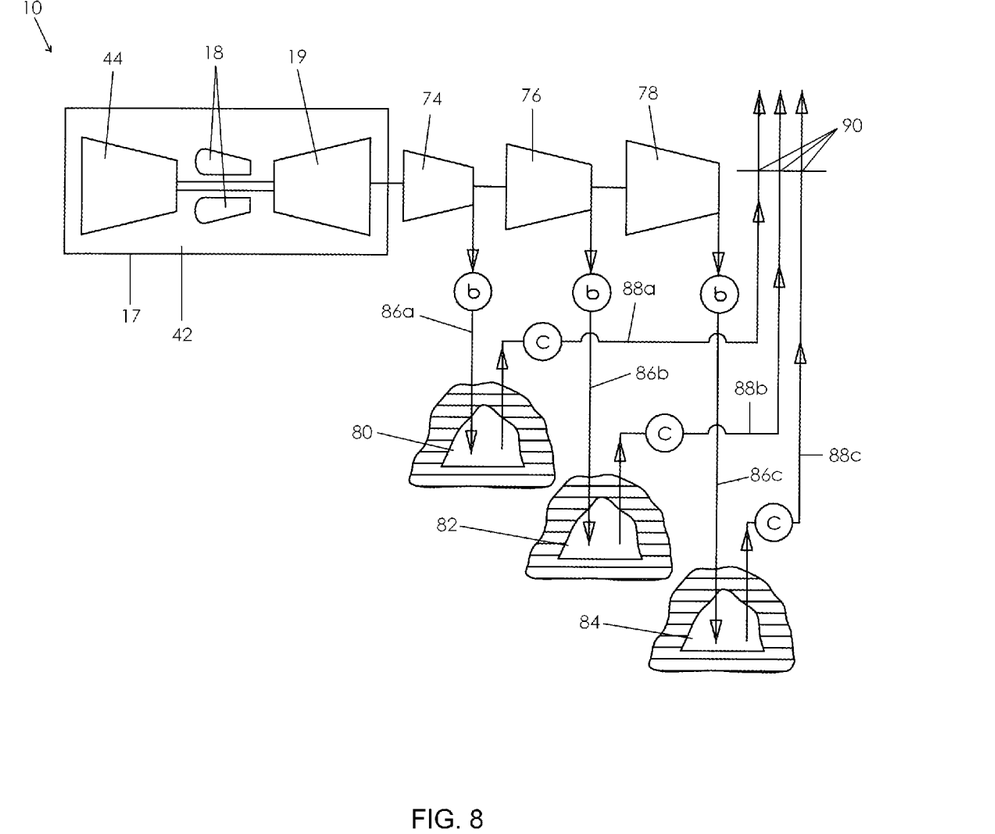
FIG. 8 shows a schematic view of an engine testing facility of the present invention with three separate compressed air reservoirs to hold different pressures of compressed air.

Referring now to FIG. 8, a further alternative embodiment of the testing facility 10 is shown that includes multiple compressed air reservoirs, each holding compressed air having a different pressure. A gas turbine engine (test engine 42), which may include a compressor 44, a combustor 18, and a turbine 19, may drive, for example, a low pressure compressor 74, a medium pressure compressor 76, and a high pressure compressor 78. Each of the compressors 74-78 may be in fluid communication with a separate compressed air storage reservoir 80, 28, 84. For example, a first flow path 86a may connect a first compressed air storage reservoir 80 to the low pressure compressor 74, a second flow path 86b may connect a second compressed air storage reservoir 82 to the medium pressure compressor 76, and a third flow path 86c may connect a third compressed air storage reservoir 84 to the high pressure compressor 78 (represented by air flow paths (b)). However, any number of additional compressors may be included, each for generating compressed air at a different pressure and being connected to a different compressed air storage reservoir, and any variety of connections and flow paths may be used. Further, each of the compressed air storage reservoirs 80, 82, 84 could also be in fluid communication with a test object 17 (not shown in FIG. 8). Further, the first flow path 88a, second flow path 88b, and third flow path 88c may connect the compressed air storage reservoirs 80, 82, 84 to a discharge point 90 (air flow paths (c)). The different volumes of compressed air having different pressures may be used for testing different components or phases of operation of a component or of an engine. For example, the low pressure reservoir 80 could be used to store compressed air at 10 to 20 bars, the medium pressure reservoir 82 could be used to store compressed air at 20 to 50 bars, and the high pressure reservoir 84 could be used to store compressed air at 50 to 200 bars (or greater). The use of the different pressure reservoirs may improve the efficiency of the testing facility 10 because compressed air of an appropriate pressure may be available without having to invest energy to pressurize or depressurize air from a single storage reservoir. For example, in other test facilities when a low-pressure compressed air is required for a test and the only available compressed air is a high-pressure compressed air, then the pressure of the high-pressure compressed air must be decreased in order to accommodate optimal testing conditions. In the process, however, the high-pressure compressed air loses energy as its pressure is decreased. Also, multiple pressure reservoirs may be used to produce different loads during the engine testing process. When a low load is required, the test engine 42 may be used to drive the low pressure compressor 74. When a high load is required, the test engine 42 may be used to drive the high pressure compressor 78. Or, a combination of compressors can be driven at the same time to provide even higher loads to the engine.

Other embodiments are also contemplated. For example, a brine solution may be stored in the reservoir 13 instead of compressed air and used to drive an electric generator and produce electrical energy. Brine is preferred over pure water because water, unlike a saturated brine solution, would dissolve the salt walls of certain types of naturally occurring or manmade caverns. Also, when fully saturated with salt, brine solution has a specific gravity of 1.2 compared to water, and therefore provides 20% more power to the same size equipment. Additionally, two caverns may be used with different elevations so that a large pressure difference may be used for power production. For example, a first cavern may be located at 500 feet below ground, whereas a second cavern may be located 1,500 feet below the ground. This may produce a pressure head equal to 1,000 feet. The saturated salt brine solution could be pumped from the lower cavern during low power demand and into the higher elevation cavern for storage until peak demand. At peak demand, the brine solution can be allowed to flow down and into the lower cavern through a turbine (such as a Francis turbine) that will be used to drive an electric generator and produce electrical energy.

Because of the higher specific gravity (compared to water) more power can be extracted from the brine solution.

In another embodiment, instead of a salt cavern with a salt brine solution, a petroleum storage cavern may be used for pressure head to drive the turbine and electric generator. For example, salt caverns are currently used for the United States Strategic Petroleum Reserve. The pumped storage facility could be used for storage of fluid height potential energy for daily use and for storage of chemical energy over the long term for emergencies. The stored fuel or oil in a storage reservoir may be used to drive the turbine and electric generator. Further, fuel or oil in one reservoir may be pumped to a higher elevation during low demand and then discharged into a lower reservoir through a turbine to drive the electric generator during peak demand.

In yet another embodiment, the power from a large gas turbine engine during testing may be dissipated and stored by pumping a liquid (such as a brine solution) between two caverns at different elevations. A turbine may be used to drive a pump that would pump a brine solution from a lower level cavern up to a higher level cavern to dissipate the energy being produced by the test engine. Then, the brine solution may be passed through another turbine from the higher elevation to the lower elevation to drive the turbine and an electric generator connected to the turbine to produce electrical power. For example, the turbine may be connected to a Francis turbine through a speed reduction gear for pumping the fluid up to the higher elevation cavern or storage reservoir. The same or a second Francis turbine be also be used to drive the electric generator when the liquid flows down to the lower elevation cavern.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A process for testing a component of a gas turbine engine, comprising:
   providing a component for testing, the test component being one of a full annular combustor, a high Mach number aero engine, a high Mach number aero vehicle, a turbine connected in its non-operating condition, or an afterburner of an aero engine;
   providing at least one compressed air reservoir having a total volume of at least 10,000 m$^3$;
   placing the test component in fluid communication with the at least one compressed air reservoir;
   providing a heating device upstream of the test component and downstream of the compressed air reservoir, the heating device increasing a temperature of compressed air from the compressed air reservoir; and
   directing the compressed air from the compressed air reservoir through the heating device and into the test component.

2. The process of claim 1, wherein the test component is at least one of a gas turbine engine, a combustor, a compressor, and a turbine.

3. The process of claim 1, wherein the heating device heats the compressed air from the compressed air reservoir to a temperature of between approximately 300° C. and approximately 900 ° C. before the compressed air enters the test component.

4. The process of claim 1, further comprising:
   providing a heat exchange device having a first flow path and a second flow path, the first flow path and second flow path being in thermal communication with each other;
   directing compressed air from the compressed air reservoir into the first flow path;
   directing compressed air from the first flow path to test component; and
   directing compressed air from the test component to the second flow path.

5. The process of claim 4, further comprising:
   providing a heater upstream of the test component;
   directing compressed air from the first flow path to the heater;
   directing compressed air from the heater to the test component; and
   directing compressed air from the test component to the second flow path.

6. The process of claim 5, wherein the heater and heat exchange device heat the compressed air from the compressed air reservoir to a temperature of between approximately 300 ° C. and approximately 900 ° C. before the compressed air enters the test component.

7. The process of claim 1, wherein the heating device is at least one of an electric heater, a plurality of electric heaters arranged in series, a gas-powered heater, a plurality of gas-powered heaters arranged in series, a heat exchange device, a thermal storage device, and a high pressure combustion heater.

8. The process of claim 1, further comprising:
   providing an air compressor downstream of the test component;
   operating the test component, the test component providing energy to the compressor to produce compressed air; and
   storing the compressed air in the at least one compressed air reservoir.

9. The process of claim 8, wherein the compressed air has a pressure of between approximately 10 bars to approximately 200 bars.

10. The process of claim 1, wherein the at least one compressed air reservoir comprises a low pressure compressed air reservoir, a medium pressure compressed air reservoir, and a high pressure compressed air reservoir.

11. The process of claim 10, further comprising:
    driving a low pressure compressor with the test component to produce a low pressure compressed air, the compressed air having a pressure of between approximately 10 bars to approximately 20 bars;
    driving a medium pressure compressor with the test component to produce a medium pressure compressed air, the compressed air having a pressure of between approximately 20 bars to approximately 50 bars; and
    driving a high pressure compressor with the test component to produce a high pressure compressed air, the compressed air having a pressure of between approximately 50 bars to approximately 200 bars; and
    storing the low pressure compressed air in the low pressure compressed air reservoir, storing the medium pressure compressed air in the medium pressure compressed air reservoir, and storing the high pressure compressed air in the high pressure compressed air reservoir.

12. The process of claim 11, further comprising:
    using the low pressure compressed air to test a test component under low pressure conditions;

using the medium pressure compressed air to test a test component under medium pressure conditions; and using the high pressure compressed air to test a test component under high pressure conditions.

13. The process of claim 1, wherein the heating device is an energy-fed, non-vitiating heating device, the energy fed to the non-vitiating heating device being one of fossil fuel and electricity.

14. A testing facility for a test component, the testing facility comprising:
one or more compressed air reservoirs having a total volume of approximately 10,000 m³ to approximately 1,000,000 m³;
one or more air flow paths in fluid communication with the one or more compressed air reservoirs;
an energy-fed, non-vitiating heating device downstream of the one or more compressed air reservoirs being in thermal communication with at least one air flow path and upstream of the test component, the energy fed to the non-vitiating heating device being one of fossil fuel and electricity, the non-vitiating heating device increasing a temperature of compressed air from the one or more compressed air reservoirs; and
the test component being one of a full annular combustor, a high Mach number aero engine, a high Mach number aero vehicle, a turbine connected in its non-operating condition, and an afterburner of an aero engine.

15. The testing facility of claim 14, further comprising:
a testing chamber having a first end and a second end, the first end being in fluid communication with the compressed air storage reservoir;
a vacuum chamber in fluid communication with the second end of the testing chamber; and
a vacuum pump in fluid communication with the vacuum chamber,
wherein a directional air flow is generated in the testing chamber from the first end to the second end from at least one of the vacuum chamber and the compressed air reservoir.

16. The testing facility of claim 14, wherein the compressed air reservoir contains at least some compressed air, the heating device heating the compressed air from the compressed air reservoir in at least one air flow path to a temperature of between approximately 300° C. and approximately 900° C.

17. The testing facility of claim 14, further comprising:
a heat exchange device having a first flow path and a second flow path, the first flow path and the second flow path being in thermal communication with each other, and the first flow path being upstream of the heating device and the second flow path being downstream of the heating device.

18. The testing facility of claim 17, wherein the compressed air reservoir contains at least some compressed air, the heating device and heat exchange device heating the compressed air from the compressed air reservoir in at least one air flow path to a temperature of between approximately 300° C. and approximately 900° C.

19. The testing facility of claim 14, wherein the heating device is at least one of an electric heater, a plurality of electric heaters arranged in series, a gas-powered heater, a plurality of gas-powered heaters arranged in series, a heat exchange device, a thermal storage device, and a high pressure combustion heater.

20. The testing facility of claim 14, wherein the one or more compressed air reservoirs is an underground plenum.

21. The testing facility of claim 14, further comprising:
a low pressure compressor producing low pressure compressed air having a pressure of between approximately 10 bars and 20 bars;
a medium pressure compressor producing medium pressure compressed air having a pressure of between approximately 20 bars and approximately 50 bars; and
a high pressure compressor producing high pressure compressed air having a pressure of between approximately 50 bars and approximately 200 bars,
the one or more compressed air reservoirs including:
a low pressure compressed air reservoir in fluid communication with the low pressure compressor;
a medium pressure compressed air reservoir in fluid communication with the medium pressure compressor; and
a high pressure compressed air reservoir in fluid communication with the high pressure compressor.

22. A testing facility for a test component, the testing facility comprising:
a test component, the test component having an optimal operating temperature, the test component being one of a full annular combustor, a high Mach number aero engine, a high Mach number aero vehicle, a turbine connected in its non-operating condition, and an afterburner of an aero engine;
at least one compressed air reservoir having a total volume of at least 10,000 m³, at least a portion of the volume containing compressed air;
a heating device upstream of the test component and downstream of the at least one compressed air reservoir, the heating device increasing a temperature of compressed air from the at least one compressed air reservoir; and
a heat exchange device having a first flow path and a second flow path, the first flow path and the second flow path being in thermal communication with each other, the first flow path being upstream of the heating device and the second flow path being downstream of the heating device;
the heat exchange device heating compressed air from the compressed air reservoir to a temperature of between approximately 300° C. and approximately 900° C., and
the heating device further heating the compressed air from the first flow path when the heat exchange device heats the compressed air to a temperature less than the optimal operating temperature of the test component.

23. A testing facility for a large frame gas turbine engine or components thereof, the testing facility comprising:
a plurality of compressed air reservoirs having a total volume of approximately 10,000 m³ to approximately 1,000,000 m³, the plurality of compressed air reservoirs including:
a low pressure compressed air reservoir in fluid communication with the low pressure compressor;
a medium pressure compressed air reservoir in fluid communication with the medium pressure compressor; and
a high pressure compressed air reservoir in fluid communication with the high pressure compressor;
a plurality of air flow paths in fluid communication with the plurality of compressed air reservoirs;
a heating device downstream of the one or more compressed air reservoirs being in thermal communication with at least one air flow path;
a low pressure compressor producing low pressure compressed air having a pressure of between approximately 10 bars and 20 bars;

a medium pressure compressor producing medium pressure compressed air having a pressure of between approximately 20 bars and approximately 50 bars; and a high pressure compressor producing high pressure compressed air having a pressure of between approximately 50 bars and approximately 200 bars.

\* \* \* \* \*